Patented May 23, 1950

2,508,388

UNITED STATES PATENT OFFICE 2,508,388

2-(p-NITROBENZENESULFONAMIDO)-THIAZOLE RETENTION ENEMA

Willard M. Hoehn, Kansas City, Mo., assignor to George A. Breon & Company, Kansas City, Mo., a corporation of Missouri No Drawing. Application May 10, 1946, Serial No. 668,783

7 Claims. (Cl. 167—51.5)

This invention relates to therapeutic compositions and more particularly to compositions containing 2-(p-nitrobenzenesulfonamido)-thiazole.

Among the objects of the present invention are the provision of a therapeutic composition containing 2-(p-nitrobenzenesulfonamido)-thiazole; the provision of a composition of the type indicated in which the 2-(p-nitrobenzenesulfonamido)-thiazole is homogeneously dispersed; the provision of a composition of the type stated in which the dispersion of the 2-(p-nitrobenzenesulfonamido)-thiazole is stable over long periods of time; the provision of a therapeutic composition which may advantageously be given in the form of a retention enema; and the provision of therapeutic compositions having desirable therapeutic properties beyond those possessed by 2-(nitrobenzenesulfonamido)-thiazole alone and methods for making such compositions. Other objects will be in part apparent and in part pointed out hereinafter.

The invention accordingly comprises the ingredients and combinations of ingredients, the proportions thereof, steps and sequence of steps, and features of composition and manipulation, which will be exemplified in the products and methods thereinafter described, and the scope of the application of which will be indicated in the following claims.

According to this invention therapeutic compositions are provided containing as an essential ingredient 2-(p-nitrobenzenesulfonamido)-thiazole. The compositions of the present invention are effective for the treatment of various infections caused by cocci and particularly the genus Streptococcus. The compositions of the present invention are particularly valuable in the treatment of ulcerative colitis and in the treatment of proctitis. They are also effective against certain types of dysentery organisms. The therapeutic compositions which are described below may be given over a long period of time without some of the side reactions which are sometimes shown by amino compounds.

The therapeutic compositions of the present invention are pectin containing suspensions of 2-(p-nitrobenzenesulfonamido)-thiazole. The resulting dispersions are uniform, homogeneous and do not tend to settle out though stored for long periods of time. They may contain added components such as acacia, flavors, sweetening agents, and preservatives such as sodium benzoate. Since 2-(p-nitrobenzenesulfonamido)-thiazole has a bitter taste a flavoring agent or sweetener is preferably employed, particularly where the suspension is to be administered orally.

The pectin suspensions of the present invention are of particular value since ordinary aqueous suspensions of 2-(p-nitrobenzenesulfonamido)-thiazole tend to settle out and the powder cakes to a hard layer which is difficult to resuspend. The addition of protective colloids such as acacia will not prevent such separation, but the pectin containing suspensions of the present invention are free from this disadvantage.

The present invention will be illustrated by the following specific examples but is not to be limited thereto.

Example 1

| | |
|---|---|
| 2-(p-nitrobenzenesulfonamido)-thiazole | 34 lbs. (10%) |
| Acacia powder | 3 lbs. 4 oz. (1%) |
| Pectin | 6 lbs. 8 oz. (2%) |
| Oil of peppermint | 78 cc. (0.05%) |
| Distilled water to make 40 gallons. | |

The pectin and acacia powder are mixed and added with stirring to 30 gallons of distilled water. Care is taken so that a minimum amount of air is stirred into this mixture. The addition is carried out by sprinkling the acacia-pectin mixture on the water slowly and when a homogeneous gel is formed the 2-(p-nitrobenzenesulfonamido)-thiazole, which is in powder form, is slowly added and the mixing continued until the 2-(p-nitrobenzenesulfonamido)-thiazole is evenly distributed. The oil of peppermint is then added to the suspension and the volume adjusted to 40 gallons with distilled water. The mixing is continued for an additional 15 minutes and the suspension is then milled with a Homoloid mill. The product contains between approximately 9 and 10.8% 2-(p-nitrobenzenesulfonamido)-thiazole.

Example 2

| | |
|---|---|
| 2-(p-nitrobenzenesulfonamido)-thiazole | 34 lbs. (10%) |
| Pectin | 7 lbs. 8 oz. (2.25%) |
| Oil of peppermint | 78 cc. (0.05%) |
| Distilled water to make 40 gallons. | |

The pectin is added with stirring to 30 gallons of distilled water, care being taken so that a minimum amount of air is stirred into the mixture. The addition is carried out by sprinkling the pectin slowly on the water. When a homogeneous gel is formed the 2-(p-nitrobenzenesulfonamido)-thiazole in powder form is slowly added and the mixing continued until the 2-(p-nitrobenzenesulfonamido)-thiazole is evenly distributed. To this suspension is then added the oil of peppermint and the volume is adjusted to 40 gallons with distilled water. The mixing is continued for an additional 15 minutes and the suspension is then milled with a Homoloid mill.

In Example 1 the proportion of acacia and pectin may be varied from approximately 0.5% pectin and 3.5% acacia to 3% pectin and 0.5% acacia. However, as stated above, the acacia may be omitted entirely if desired.

The oil of peppermint employed in the preceding examples may be omitted if desired or other flavorings may be substituted, and sweetening and preservative agents may also be added if desired.

The proportion of pectin employed should not be substantially less than 0.5% and should not be great enough to render the suspension solid unless a solid suspension is desired.

The pectin suspensions of the present invention are uniform, homogeneous dispersions of the 2-(p-nitrobenzenesulfonamido)-thiazole and these uniform homogeneous dispersions are stable over long periods of time. On the other hand aqueous suspensions containing no pectin tend to settle out and cake even though they contain a protective colloid such as acacia. Such caking forms a hard layer which is difficult to resuspend.

The pectin containing suspensions of the present invention are advantageously administered to the patient in the form of a retention enema. It has been found that in such cases the pectin itself has desirable properties of absorbing toxic substances from the intestine. The suspensions of the present invention may also be administered in other ways; e. g. orally.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

I claim:

1. A retention enema comprising a suspension of 2-(p-nitrobenzenesulfonamido)-thiazole and pectin.

2. A retention enema comprising an aqueous suspension of 2-(p-nitrobenzenesulfonamido)-thiazole and pectin.

3. A retention enema comprising as an essential active ingredient 2-(p-nitrobenzenesulfonamido)-thiazole, and pectin as a suspending agent therefor.

4. A retention enema consisting by weight approximately of 2-(p-nitrobenzenesulfonamido)-thiazole 10%, pectin not substantially less than 0.5% and water.

5. A retention enema consisting by weight approximately of

| | Per cent |
|---|---|
| 2-(p-nitrobenzenesulfonamido)-thiazole | 10 |
| Acacia powder | 1 |
| Pectin | 2 |
| Water | Balance |

6. A retention enema consisting by weight approximately of

| | Per cent |
|---|---|
| 2-(p-nitrobenzenesulfonamido)-thiazole | 10 |
| Pectin | 2.25 |
| Water | Balance |

7. A retention enema comprising water and pectin and containing as an essential active therapeutic ingredient 2-(p-nitrobenzenesulfonamido)-thiazole.

WILLARD M. HOEHN.

REFERENCES CITED

The following references are of record in the file of this patent:

UNITED STATES PATENTS

| Number | Name | Date |
|---|---|---|
| 2,166,868 | Jones | July 18, 1939 |

OTHER REFERENCES

J. Kansas Medical Soc. 43 (July 1942), pages 237–289.

The Lancet, June 26, 1943, page 82.

J. Amer. Pharm. Assoc., Prac. Pharm. Edition, May 1946, p. 234.

"New Modern Drugs," Gutman, Supplements to 2nd edition, 18th Supp. (April 1945), page 24; 19th Supp. (July 1945), page 15; 20th Supp. (Oct. 1945), pages 20 and 22.